US009052796B2

(12) United States Patent
Brun

(10) Patent No.: US 9,052,796 B2
(45) Date of Patent: Jun. 9, 2015

(54) ASYNCHRONOUS HANDLING OF AN INPUT STREAM DEDICATED TO MULTIPLE TARGETS

(75) Inventor: Nicolas Brun, Seattle, WA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 0 days.

(21) Appl. No.: 13/556,216

(22) Filed: Jul. 24, 2012

(65) Prior Publication Data

US 2013/0179904 A1 Jul. 11, 2013

Related U.S. Application Data

(60) Provisional application No. 61/584,292, filed on Jan. 8, 2012.

(51) Int. Cl.
*G06F 3/00* (2006.01)
*G06F 9/44* (2006.01)
*G06F 9/46* (2006.01)
*G06F 13/00* (2006.01)
*G06F 3/0481* (2013.01)
*G06F 9/54* (2006.01)

(52) U.S. Cl.
CPC ............ *G06F 3/04812* (2013.01); *G06F 9/542* (2013.01)

(58) Field of Classification Search
None
See application file for complete search history.

(56) References Cited

U.S. PATENT DOCUMENTS

| 6,314,471 | B1 | 11/2001 | Alverson et al. |
| 6,321,252 | B1 | 11/2001 | Bhola et al. |
| 6,459,419 | B1 * | 10/2002 | Matsubayashi ............... 345/156 |
| 6,901,596 | B1 | 5/2005 | Galloway |
| 7,239,401 | B2 | 7/2007 | Dodge et al. |
| 7,549,151 | B2 | 6/2009 | Zhou et al. |
| 7,949,106 | B2 | 5/2011 | Erhart et al. |
| 2005/0091611 | A1 * | 4/2005 | Colleran et al. ............. 715/804 |
| 2005/0261909 | A1 | 11/2005 | Sienel et al. |
| 2006/0109866 | A1 * | 5/2006 | Janssen et al. ................ 370/493 |
| 2008/0034292 | A1 * | 2/2008 | Brunner et al. ............... 715/700 |

OTHER PUBLICATIONS

Koster, et al., "Using Message-based Threading for Multimedia Applications", Retrieved at <<http://ieeexplore.ieee.org/stamp/stamp.jsp?tp=&arnumber=1237791>> Proceedings: International Conference on Multimedia and Expo (ICME). IEEE, Aug. 22-25, 2001, pp. 599-602.
"Asynchronous Handling of a User Interface Manipulation", U.S. Appl. No. 13/150,762, filed Jun. 1, 2011, pp. 39.

* cited by examiner

*Primary Examiner* — Craig Dorais
(74) *Attorney, Agent, or Firm* — Jim Banowsky; Leonard Smith; Micky Minhas

(57) ABSTRACT

An operating system has a stack of input events (an input stack) that provides input events from various input devices to applications. A dedicated thread or other entity is provided to handle input events that are related to pixel manipulation on the display, so as to provide a highly responsive display. The thread includes a buffer, and manages the buffer so as to ensure that messages a received by an application or other entity in chronological order.

20 Claims, 4 Drawing Sheets

ASYNCHRONOUS HANDLING OF AN INPUT STREAM DEDICATED TO MULTIPLE TARGETS

CROSS-REFERENCE TO RELATED APPLICATIONS

This application is a non-provisional application claiming priority under 35 U.S.C. §119 to U.S. provisional patent application Ser. No. 61/584,292, filed Jan. 8, 2012, which is hereby incorporated by reference.

BACKGROUND

An operating system for a computer generally can handle input events from input devices on the computer in a variety of ways. In general, the operating system orders input events from multiple input devices by their time of occurrence, provides the ordered input events to applications on the computer. Input events that affect visual elements on a display can be handled by a dedicated thread, separate from main application threads, in order to allow these visual elements to be manipulated quickly and provide a smooth end user experience.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

To consume input events in a dedicated thread, the stream of inputs reaching a component is handled synchronously while being reconciled with the protocol used to communicate with the application, which is asynchronous. This problem of reconciling synchronous input handling with the asynchronous protocol is particularly challenging if multiple contacts are involved, each of them manipulating a different target. In such a case, input ordering needs to be preserved and different actions might need to be performed on each contact. As a result, multiple streams of inputs are effectively created, all originating from one single serialized stream, each of them being handled asynchronously and independently.

To solve this problem, a dedicated input thread, or other entity, buffers all input events as they are received in one buffer queue, until the thread processes and determines what to do with each input event. For each new contact received, the thread requests the application to identify what to do with the associated stream of inputs as fast as possible. It is possible that some input events are discarded to preserve input ordering presented to the main application.

For example, unless two contacts are known to be handled separately, an input message is not processed if the thread has not yet determined what to do with some inputs for another contact which precedes it in the history, so as to preserve the order of messages consumed by the thread.

After the thread consumes an input message, it informs the main input stack of the operating system what to do with the input. Because the thread creates multiple input streams from one input stream, the thread reconsolidates each separated stream into one single input stream, ordered correctly, so the input stack of the operating system can appropriately perform the action requested on each message. To perform this reconsolidation, the thread uses another buffering mechanism to ensure the operation system performs the relevant actions in chronological order.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

An operating system has a stack of input events (an input stack) that provides input events from various input devices to applications. As described in U.S. Patent Application entitled "Asynchronous Handling of a User Interface Manipulation," filed on Jun. 1, 2011, by Laurent Mouton, and hereby incorporated by reference, a dedicated thread, or other similar entity, is provided to handle input events that are related to pixel manipulation on the display, so as to provide a highly responsive display.

Figure 1:
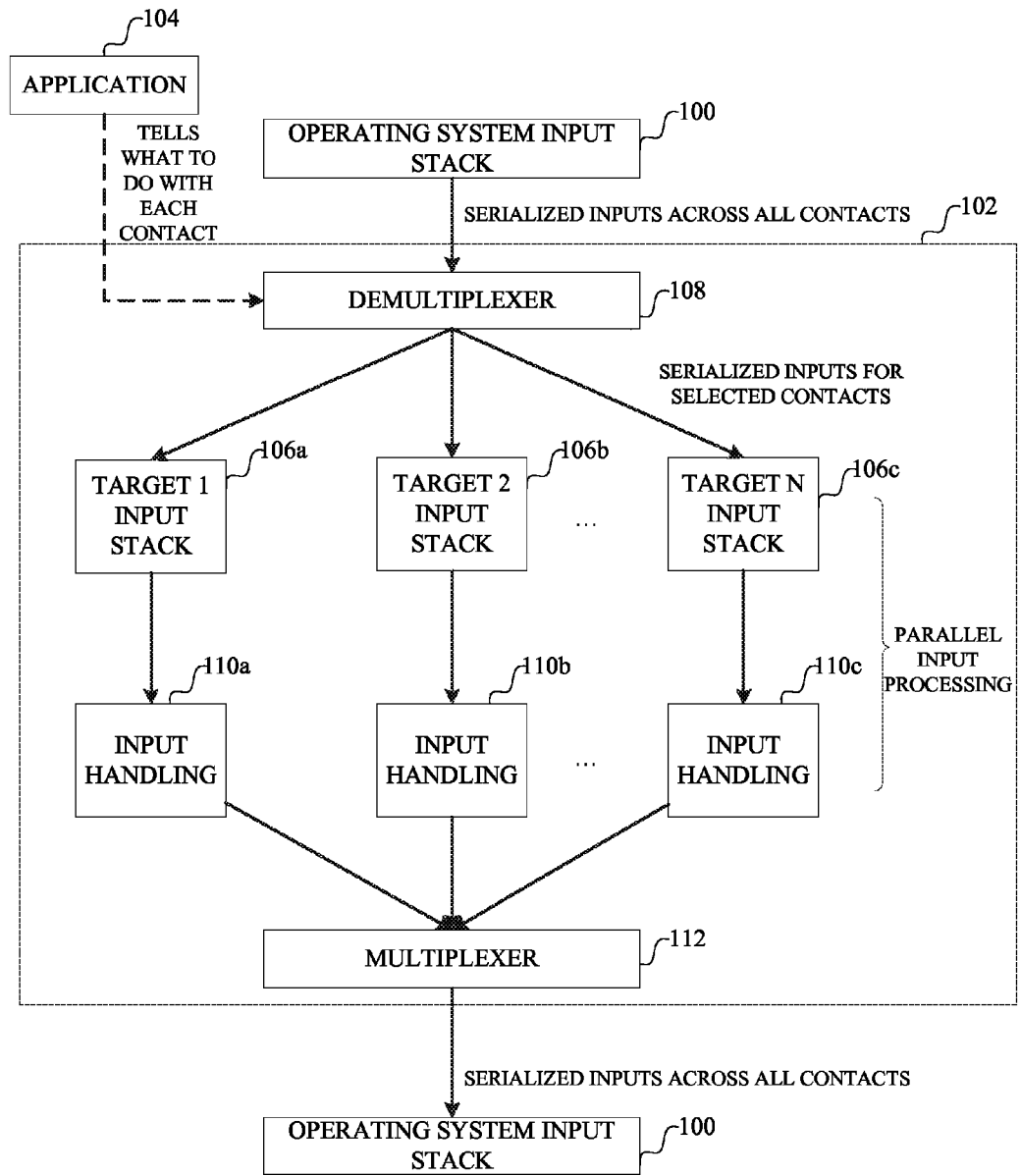
FIG. 1 is an example system diagram of a system using a dedicated thread for processing visual elements related to an input event.

Referring to FIG. 1, the operating system input stack 100 is processed by an entity called herein a handler 102 that handles input events related to pixel manipulation, such as determining position or compositing. The handler 102 receives information from applications 104 identifying, for each input stream (or contact), what action is to be performed for that contact. The handler buffers input events in a buffer, i.e., 108, until it determines what it should do with the input event based on the information provided by the application 104. It is possible that input events include information for two or more contacts, or points related to the display that originate from an input device. Such contacts might be, for example, points touched on a touch screen. The handler 102 may create one or more queues 106a, 106b and 106c, one for each group of contacts that are processed together. A demultiplexer 108 filters the input events into the different queues. As the input events are processed by input handlers 110a, 110b, 110c, the input events can be either removed from the operating system input stack (if they are fully processed by the handler 102), or can be reinjected back into the operating system input stack for delivery to applications after they are processed by the handler 102. The handler 102 maintains the ordering of these input events through multiplexer 112.

Figure 2:
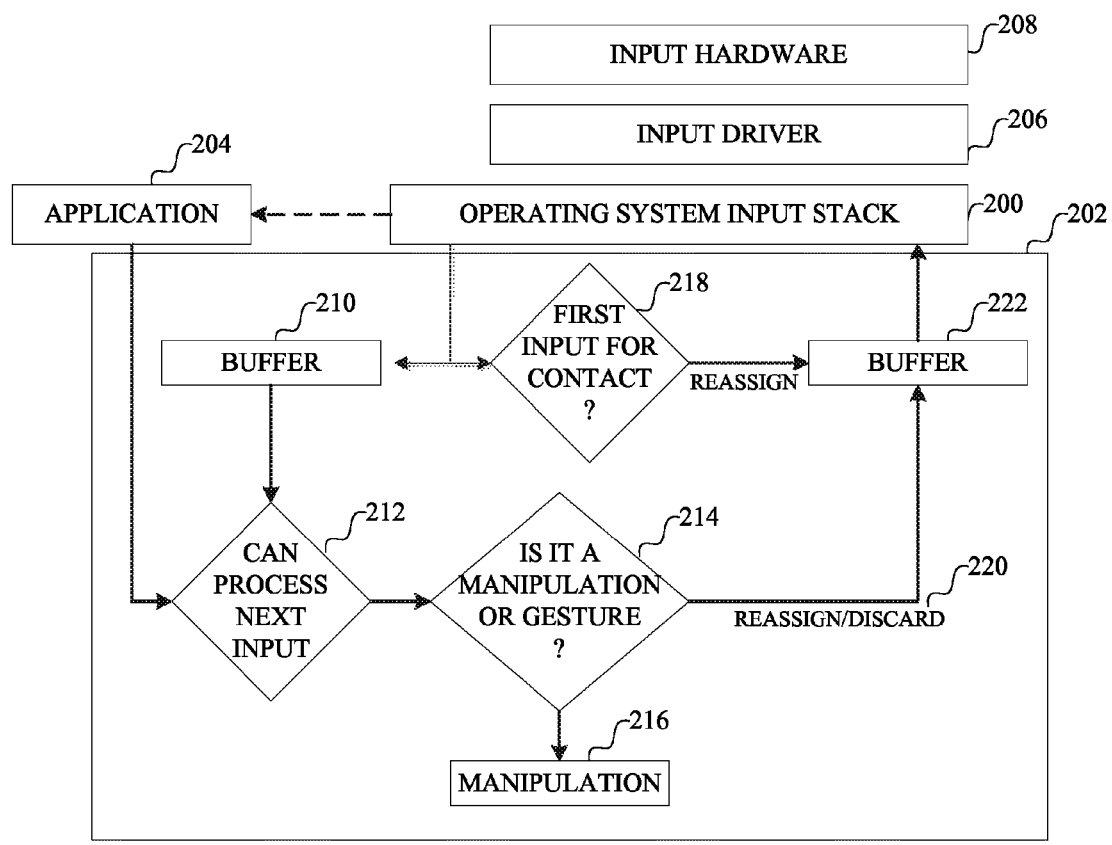
FIG. 2 is an example flow chart of operation of a dedicated thread for processing visual elements related to an input event.

Referring now to FIG. 2, the handler 102 of FIG. 1 (202 in FIG. 2), receives input events from the operating system input stack 200 (which it, in turn, had received from the input driver 206 for an input device 208). For each new contact, the handler 202 lets the application receive the associated very first input message 218 by buffering it in the output buffer queue 222 so it can be re-injected into the operating system input stack 200 and eventually be sent to the application 204. The handler includes a buffer 210 for storing input events as they are received. After an application 204 receives the very first input message for a given contact (which the handler has previously re-assigned 218), it provides information to the handler 202 about what actions are to be performed in connection with all input events for the given contact. If an input event can be processed (as indicated at 212) by the handler, based on information for the application 204, and if the input event is a manipulation or other input affecting the visual display (as indicated at 214), an appropriate manipulation 216 is applied. Otherwise, the input event (and all previously buffered input events for this contact 210) may be reassigned (e.g., to the application 204 instead of the handler 202), as indicated at 220, buffered in output buffer 222, and reinjected into the operating system input stack 200.

With this kind of software architecture, several problems that the handler implementation can address will now be described. The implementation of the handler can include:

Buffering of input events while waiting to know what action to perform on them from the main application thread.

Handling of multiple contacts and multiple targets, in particular:

Handling of possible dead-lock situations when the application is waiting for new inputs from the handler while at the same time the handler is waiting for the application to trigger an action;

Ensuring consumption of input events in correct order by the handler; and

Guaranteeing correct ordering of inputs that the main application thread receives.

Providing a mechanism for applications to opt-into receiving input and managing the co-existence of inputs that are processed by the handler and ones that are forwarded to the application.

Auto-detecting when an input should be handled synchronously.

Detecting stale pointers as a result of the main application thread being irresponsive.

Providing a mechanism for applications to trigger a manipulation while the main application thread might be unresponsive.

Each of these will now be described in more detail.

Buffering Input Events.

As noted above, the handler buffers input events as they are received while waiting for the application to inform the handler what to do with input messages. As new input messages are received and buffered, the handler checks if there are any currently buffered messages that can be processed, i.e., the application has provided information about what to do for the associated contact. If the handler can process some buffered messages, it removes them from the queue and processes them in first-in, first-out (FIFO) order. Thus, processing of buffered messages stops either when the queue is empty or when a message is encountered for which the application has not yet provided information about what to do with it.

If a newly received input message is the first one received for a particular contact, it is sent to the application (asynchronously), so the application can let the handler know how to handle this contact. In the meantime, the input message is placed in the queue for that contact, and any new input messages will continue to be buffered and queued while the handle waits for the application to respond.

Figure 4:
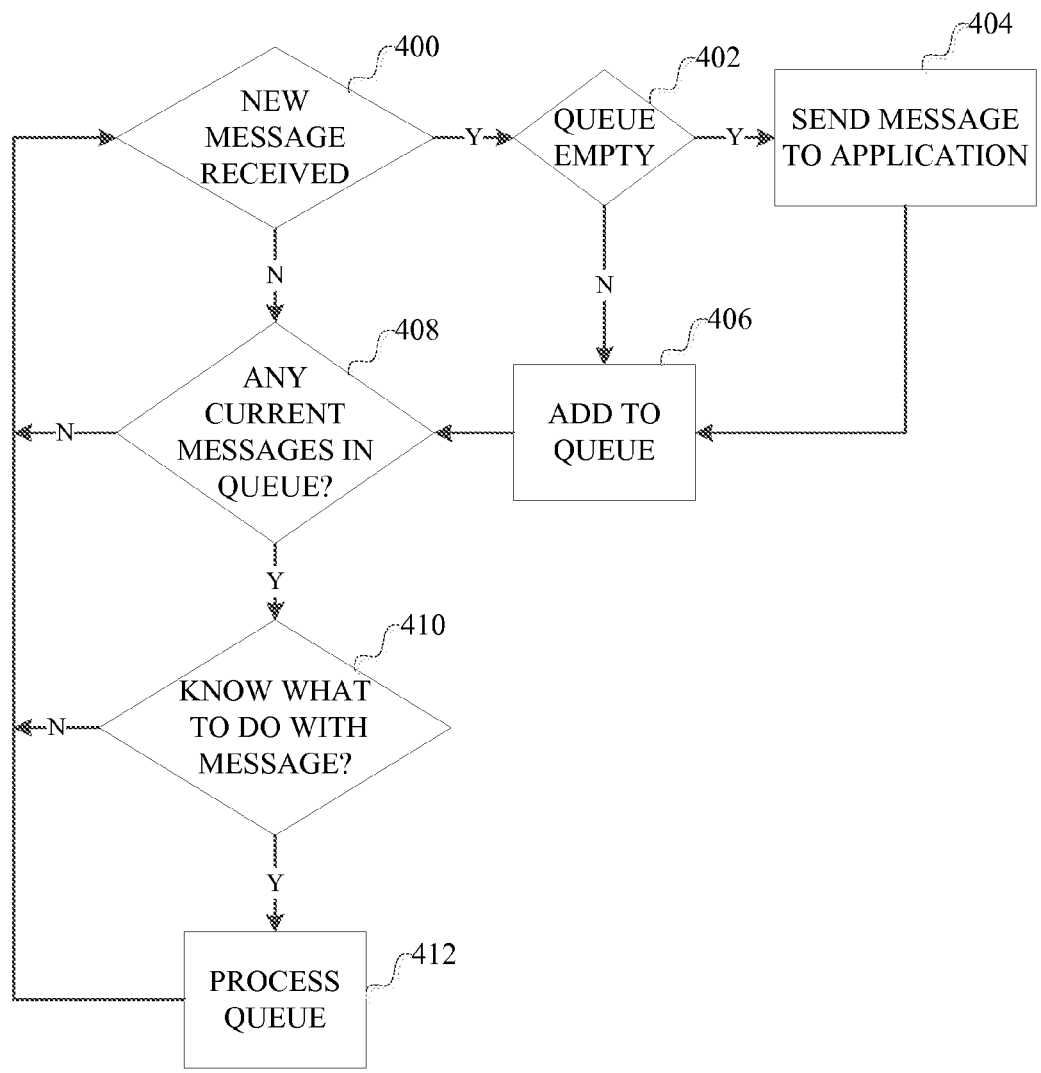
FIG. 4 is a flow chart describing how input messages for a contact are processed by an input handler.

Thus, referring to FIG. 4, the handler takes action when a new input message is received (400) for a contact or when the application informs (404) the handler what to do with a contact.

If the handler receives 400 a new input message for a contact, the handler determines 402 if the queue is empty for that contact. If the queue is empty, then the new input message is sent 404 to the application, and then added 406 to the queue. Otherwise, the new input message is simply added 406 to the queue.

If the handle determines 408 that there are current messages in the queue, the handler determines 410 if the application has informed the handler what to do with any of those messages. If the application has informed the handler what to do with the input messages, then the queue of messages is processed 412.

The handler can periodically test conditions 400 and 408/410, or these decisions can be events handled by the handler. Such processing is performed for each contact detected in the input data.

After the application informs the handler what to do with an input, there are, in general, two possible scenarios for the handler to process the queue of input messages for an application.

In the first scenario, the handler sends all the inputs for this contact to the application. In this scenario, for each message buffered by the handler, the handler reinjects the messages into the operating system input stack to forward each of them to the application in order. In addition, the handler continues to forward any additional incoming messages for this contact to the application in the same way.

In the second scenario, the handler consumes the inputs for this contact and triggers a manipulation. In this scenario, each message that has been buffered by the handler is consumed accordingly. Each of these messages is removed from the operating system input stack so the application never receives it. The handler continues consuming any additional incoming input messages for this contact, and removes them from the operating system input stack. Additionally, the handler sends a dedicated message to the application to inform the application that the application will not receive any more input messages for this contact.

It is possible that the stream of input messages related to a contact will be closed, i.e., the end-user released contact, by the time the application informs the handler what to do with the contact. Therefore, the handler drains the buffer for a contact at the time the application calls back, (because no new input message would otherwise trigger processing the queue).

Application Opt-in.

Because the handler buffers input messages, the handler effectively is preventing the application from receiving any input. However, there are cases when an application might not want to trigger a manipulation, such as when a visual element that cannot be manipulated is "hit-tested." To solve this problem, the handler tracks inputs that are sent to the application. In particular, the handler tracks the first input received for a particular contact by using a mechanism within the operating system that monitors operating system messages that an application receives, such as a dedicated application message hook. Using this mechanism, the handler effectively knows once the application is done processing the input that was forwarded to it. If the application does not ask for any manipulation to be triggered after it has consumed the message, then the handler automatically assumes that the application wants input messages and does not want the handler to process the input messages for it.

Auto-Detection of Synchronous Handling of Inputs

While an application may have informed the handler to manipulate a particular element upon processing a particular contact, it is possible that the end-user will not perform a manipulation. For example, an end user might double tap, or press and hold a contact, instead of performing a pan, zoom or other manipulation. In other words, the handler might not be able to determine, from the first input message for a contact, what the nature of a manipulation will be, if any. Instead of waiting to know what to do with the first input message, the handler immediately sends the first input message for a contact to the application. If the input message results in merely a hit-test on an element that can be manipulated, the application will ask the handler to trigger a manipulation. The handler then starts consuming inputs for this contact. However, the handler initiates a "wait-and-see" mode, while it continues to process inputs but has not yet determined if the end-user is indeed doing a manipulation. While in such a "wait-and-see" mode, the handler keeps the inputs for this particular contact in a buffer until the end user action is determined. When the end user action is determined, there are in general two scenarios.

In the first scenario, the end user is performing a manipulation. In this scenario, all inputs are removed from the queue and from the operating system input stack, and the manipulation is performed.

In the second scenario, the end user performed a gesture, such as a "tap." In this scenario, all inputs are removed from our queue and are reinjected into the operating system input stack to be directed to the application.

Ensuring Consumption of Input Events in Correct Order

As input messages are received, the handler buffers them as described above. If multiple contacts are involved, the input messages are buffered in sequential order. This ordering is important as the inputs across multiple contacts might affect the same visual element. This means, if some input messages for a first contact C1 are intertwined with some input messages for a second contact C2, then the handler can only drain the buffer if the handler knows what to do with the messages for both of the contacts C1 and C2. If the handler knows what action to perform for the first contact C1, then the handler can drain the buffer until the first input message for the second contact C2. Then, the handler waits until the handler knows what to do with the messages for the second contact C2 before continuing to process any potential remaining input messages for the first contact C1 that occur later in the queue.

Handling Dead-Lock Situations

When the handler receives a first input for a new contact, the input can be sent immediately to the application. However, if the buffer is not empty at that time and if the message were sent to the application immediately, then it is possible that messages could be sent out of order to the application. Indeed, there may be a message in the buffer that would later be sent to the application. However, if a new input is not sent to the application, dead-lock might occur.

For example, an input (P2) for a new contact is buffered by the handler. The handler does not know how to handle the input until the application tells it how to handle this contact. The application does not tell the handler how to handle this contact until the handler sends the first input (P2) to it. If the handler can process previous inputs, the buffer will drain and the handler will be able to send the new input (P2) for the new contact to the application. However, because multiple inputs (for the same contact) may need to be received in order for the handler to determine what to do with a contact, the handler might not know how to handle an input until the handler receives enough messages for a particular contact. At this point, the handler cannot process any more inputs in the buffer, and the handler would keep buffering.

To avoid dead-lock, the handler discards from the operating system input stack any input "update" message, which occurs between a down event (very first input message for a given contact) and an up event (very last input message for a given contact), for previous contacts in the buffer, effectively forcing coalescing. As a result, only "down" and "up" input events remain in the operating system input stack. If any "up" inputs are present, then the handler can stop, and the queue can drain itself (because the "up" event enables a gesture to be detected). If no "up" inputs are present, then there are only several "down" inputs in a row, which the handler can send to the application in chronological order.

The handler is not, however, discarding any input in its own buffer. The only discarded inputs were in the operating system input stack. Thus, the handler will have the entire list of input messages if the handler needs to process them later on.

Guaranteeing Correct Ordering of Inputs

As noted above, the handler ensures that the first input message for a new contact is not forwarded to the application while a potential input for another contact is still in the queue and the handler is waiting for the application to provide information about what to do with that potential input.

However, maintaining such ordering is more complicated when multiple targets are involved, i.e., when some contacts (C1) are targeting one element, and some others (C2) are targeting another one. In this case, it is possible that the handler already has information indicating that the handler can remove all messages for one contact (C1) from the operating system input stack, while the handler is waiting to determine how to handle the messages for other contact (C2). However, in this case, the handler is not waiting for the application. Indeed, the application already specified to the handler to start processing both inputs. The buffer can be drained. But, it is possible that the handler does not have information indicating how to handle one of the contacts (i.e., if other input messages related to the contact should be re-injected into the operating system input stack or not).

While the handler is waiting to determine how to process a contact, the processing of the inputs for the other contacts should not be blocked. However, if the operating system input stack does not enable the handler to perform one action on a particular message without affecting all the previous inputs in its stack, then the handler requests the operating system input stack to process the messages in chronological order.

To solve this problem, the handler has a secondary queue. After the handler determines what action will be requested of the operating system input stack to perform on a particular message, the message is placed in the secondary queue. Similarly to the first queue, the handler does not actually request that the operating system input stack perform an action on a message before the handler has performed an action on each message preceding that message.

Detection of Stale Pointers

It is possible that an application is not responsive for some period of time. As a result, the handler might have to wait for a long time before determining what to do for a particular contact, and the buffer could become very large. Additionally, a bad end user experience could result if, suddenly, after the application becomes responsive, thousands of input messages that have buffered are processed.

To address this problem, each time the handler receives a first input for a new contact, a timestamp for the input message is stored. Then, the buffer can be monitored to determine if there are any input messages for a contact, for which the action to perform still is to be determined, and for which the timestamp is more than some time threshold old. If there are any such messages, they are considered stale, and all input messages for this contact, i.e. all input messages that have been buffered so far and all the potential incoming ones, are discarded. The handler then requests that the operating system input stack remove each input message for this contact.

Additionally, in rare cases, it is possible that the application may have already seen one of the inputs of a contact that the handler is discarding, i.e., the input message sent to the application so the application can let the handler know what to do with a contact. To solve this problem, the operating system input stack is requested to go clean up any potential input message in the application message queue for the particular contact to be discarded and to generate an "end of stream" message to let the application know it won't receive any more message for this contact.

Triggering a Manipulation while an Application is Unresponsive

In the description above, it is assumed that the main application informs the handler what to do with each new contact. This assumption has two potential issues. First, when there are multiple contacts involved, it might not be possible to ask the application what to do for a particular contact without discarding several input messages for other contacts. Also, if the application main thread is not very responsive, the handler can wait too long before starting taking action on input messages for a particular contact.

To solve both of these problems, an opt-in mechanism can be provided that enables the application to receive the first input message for each contact on a dedicated thread or other entity. Because only the very first input of each contact is sent to this new entity, there are no chronological considerations anymore and these messages can be sent as soon as they are received. Also, the application can use this entity to respond as fast as possible to the handler's request without requiring deep architectural changes in order for a main thread of the application to be more responsive.

Having now described an example implementation, a computing environment in which such a system is designed to operate will now be described. The following description is intended to provide a brief, general description of a suitable computing environment in which this system can be implemented. The system can be implemented with numerous general purpose or special purpose computing hardware configurations. Examples of well known computing devices that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

Figure 3:
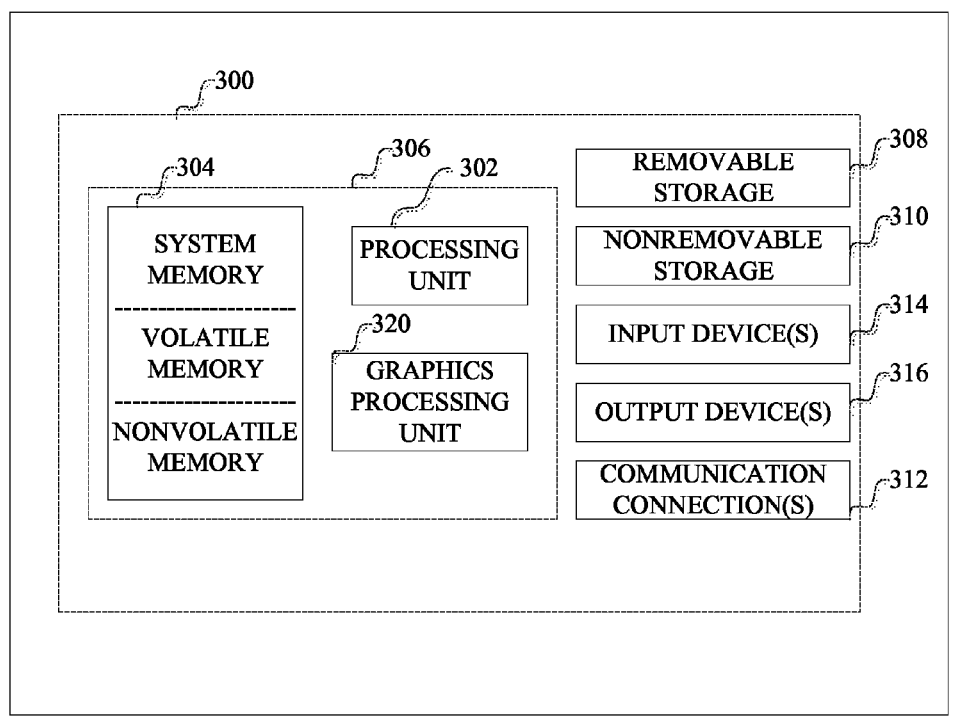
FIG. 3 is a block diagram of an example computing device in which such a system can be implemented.

FIG. 3 illustrates an example of a suitable computing system environment. The computing system environment is only one example of a suitable computing environment and is not intended to suggest any limitation as to the scope of use or functionality of such a computing environment. Neither should the computing environment be interpreted as having any dependency or requirement relating to any one or combination of components illustrated in the example operating environment.

With reference to FIG. 3, an example computing environment includes a computing machine, such as computing machine 300. In its most basic configuration, computing machine 300 typically includes at least one processing unit 302 and memory 304. The computing device may include multiple processing units and/or additional co-processing units such as graphics processing unit 320. Depending on the exact configuration and type of computing device, memory 304 may be volatile (such as RAM), non-volatile (such as ROM, flash memory, etc.) or some combination of the two. This most basic configuration is illustrated in FIG. 3 by dashed line 306. Additionally, computing machine 300 may also have additional features/functionality. For example, computing machine 300 may also include additional storage (removable and/or non-removable) including, but not limited to, magnetic or optical disks or tape. Such additional storage is illustrated in FIG. 3 by removable storage 308 and non-removable storage 310. Computer storage media includes volatile and nonvolatile, removable and non-removable media implemented in any method or technology for storage of information such as computer program instructions, data structures, program modules or other data. Memory 304, removable storage 308 and non-removable storage 310 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing machine 300. Any such computer storage media may be part of computing machine 300.

Computing machine 300 may also contain communications connection(s) 312 that allow the device to communicate with other devices. Communications connection(s) 312 is an example of communication media. Communication media typically carries computer program instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media.

Computing machine 300 may have various input device(s) 314 such as a keyboard, mouse, pen, camera, touch input device, and so on. Output device(s) 316 such as a display, speakers, a printer, and so on may also be included. All of these devices are well known in the art and need not be discussed at length here.

Such a system may be implemented in the general context of software, including computer-executable instructions and/or computer-interpreted instructions, such as program modules, being processed by a computing machine. Generally, program modules include routines, programs, objects, components, data structures, and so on, that, when processed by a processing unit, instruct the processing unit to perform particular tasks or implement particular abstract data types. This system may be practiced in distributed computing environments where tasks are performed by remote processing devices that are linked through a communications network. In a distributed computing environment, program modules may be located in both local and remote computer storage media including memory storage devices.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

What is claimed is:

1. A computer-implemented process for communicating input events from input devices connected to a computer to applications running on the computer, the computer having an operating system comprising a first entity, and an application running on the computer and comprising a second entity, the application receiving the input events from the operating system through an input stack, the process comprising:
   receiving, at the first entity in the operating system, input events from the input devices connected to the computer, the input events being directed to the application; and
   the first entity in the operating system informing the second entity of the application about receipt of the input events;
   after informing the second entity about receipt of the input events, the first entity in the operating system buffering the received input events in a buffer until the first entity receives information from the second entity indicating processing is to be performed by the first entity on the input events; and
   after receiving the information from the second entity indicating processing is to be performed by the first entity on the input events, the first entity in the operating system processing the input events and placing at least some of the input events in the input stack, and removing the input events from the buffer; and
   enabling the first entity to perform a user interface manipulation based on one of the input events while the second entity is unresponsive.

2. The computer-implemented process of claim 1, wherein the input events relate to multiple contacts.

3. The computer-implemented process of claim 2, wherein the input events relate to multiple targets in a user interface for the application that can be manipulated.

4. The computer-implemented process of claim 2, wherein the first entity consumes the input events in the buffer in chronological order.

5. The computer-implemented process of claim 2, wherein the first entity passes the input events to the second entity from the buffer in chronological order.

6. The computer-implemented process of claim 2, further comprising forwarding the input events to the second entity when the second entity does not instruct the first entity to process the input events.

7. The computer-implemented process of claim 1, further comprising detecting when one of the input events should be handled synchronously.

8. The computer-implemented process of claim 1, further comprising detecting if one of the input events is stale as a result of the second entity being unresponsive.

9. A computer program product comprising:
   a computer readable storage medium, including at least one of memory and nonvolatile storage;
   computer program instructions stored on the computer readable storage medium that, when processed by a computer, instruct the computer to perform a process, wherein the computer comprises one or more input devices providing input events to be communicated to applications running on the computer, an operating system comprising a first entity, and an application running on the computer and comprising a second entity, the application receiving the input events from the operating system through an input stack, comprising:
   receiving, at the first entity in the operating system, input events from the input devices connected to the computer, the input events being directed to the application; and
   the first entity in the operating system informing the second entity of the application about receipt of the input events;
   after informing the second entity about receipt of the input events, the first entity in the operating system buffering the received input events in a buffer until the first entity receives information from the second entity indicating processing is to be performed by the first entity on the input events; and
   after receiving the information from the second entity indicating processing is to be performed by the first entity on the input events, the first entity in the operating system processing the input events and placing at least some of the input events in the input stack, and removing the input events from the buffer; and
   enabling the first entity to perform a user interface manipulation based on one of the input events while the second entity is unresponsive.

10. The computer program product of claim 9, wherein the input events relate to multiple contacts.

11. The computer program product of claim 10, wherein the input events relate to multiple targets in a user interface for the application that can be manipulated.

12. The computer program product of claim 10, wherein the first entity consumes the input events in the buffer in chronological order.

13. The computer program product of claim 10, wherein the first entity passes the input events to the second entity from the buffer in chronological order.

14. The computer program product of claim 10, further comprising forwarding the input events to the second entity when the second entity does not instruct the first entity to process the input events.

15. The computer program product of claim 9, further comprising detecting when one of the input events should be handled synchronously.

16. The computer program product of claim 9, further comprising detecting if one of the input events is stale as a result of the second entity being unresponsive.

17. A computer comprising:
   one or more processing units executing computer program instructions stored in a computer readable storage device, such that the computer includes:
   an operating system comprising a first entity, wherein the first entity receives input events from input devices connected to the computer, the input events being directed to an application running on the computer, the application receiving the input events from the operating system through an input stack;
   the application including a second entity separate from the operating system and the first entity;
   the first entity in the operating system informing the second entity of the application about the input events;
   wherein, after informing the second entity about receipt of the input events, the second entity-provides information to the first entity indicating processing is to be performed by the first entity on the input events; and
   the first entity being enabled to perform a user interface manipulation based on one of the input events while the second entity is unresponsive;
   the first entity including a buffer in memory accessible by the one or more processing units, the first entity buffering received input events in the buffer until receiving the information from the second entity indicating processing is to be performed by the first entity on the input events, and the first entity processing the input events after receiving the information from the second entity indicating processing is to be performed by the first entity on the input events and placing at least some of the input events in the input stack, and removing the input events from the buffer.

18. The computer of claim 17, wherein the input events relate to multiple contacts.

19. The computer of claim 18, wherein the input events relate to multiple targets in a user interface for the application that can be manipulated.

20. The computer of claim 18, wherein the first entity passes the input events to the second entity from the buffer in chronological order.

* * * * *